United States Patent
Manasek

(10) Patent No.: US 10,871,328 B2
(45) Date of Patent: Dec. 22, 2020

(54) TOP LOADING ROOF FOR ELECTRIC ARC, METALLURGICAL OR REFINING FURNACES AND SYSTEM THEREOF

(71) Applicant: AMERIFAB, INC., Indianapolis, IN (US)

(72) Inventor: Richard J. Manasek, Carmel, IN (US)

(73) Assignee: AMERIFAB, INC., Indianapolis, IN (US)

(*) Notice: Subject to any disclaimer, the term of this patent is extended or adjusted under 35 U.S.C. 154(b) by 368 days.

(21) Appl. No.: 15/883,175

(22) Filed: Jan. 30, 2018

(65) Prior Publication Data

US 2018/0216888 A1 Aug. 2, 2018

Related U.S. Application Data

(60) Provisional application No. 62/452,061, filed on Jan. 30, 2017.

(51) Int. Cl.
*F27D 1/02* (2006.01)
*F27D 1/12* (2006.01)
(Continued)

(52) U.S. Cl.
CPC .............. *F27D 1/12* (2013.01); *F27B 3/085* (2013.01); *F27B 3/24* (2013.01); *F27D 11/08* (2013.01);
(Continued)

(58) Field of Classification Search
CPC ... F27D 1/025; F27D 1/12; F27D 1/16; F27D 1/1816; F27D 11/08; F27D 2009/0013;
(Continued)

(56) References Cited

U.S. PATENT DOCUMENTS

| 60,461 A | 12/1866 | Bartlett |
| 1,774,150 A | 8/1930 | Murray |

(Continued)

FOREIGN PATENT DOCUMENTS

| CN | 2798016 Y | 7/2006 |
| DE | 3701614 C2 | 8/1988 |

(Continued)

OTHER PUBLICATIONS

The Riverside Publishing Company; New Riverside University Dictionary; Copyright 1984, 1988, 1994; Cover, Inside Cover, pp. 703 and 969.

(Continued)

*Primary Examiner* — Hung D Nguyen
(74) *Attorney, Agent, or Firm* — Taft Stettinius & Hollister LLP; Stephen F. Rost

(57) ABSTRACT

A method of quickly changing a portion of the roof of an electric arc furnace having a top loading roof system comprising providing at least one pie-shaped water cooled panel supported below the roof support beams and located to protect the underside hot face of the roof support beams, providing at least one quick water disconnect for connecting the at least one pie-shaped water cooled panel to a water supply, raising and removing the at least one pie-shaped water cooled roof panel, replacing the at least one pie-shaped water cooled roof panel with another pie-shaped water cooled panel or repairing the at least one pie-shaped water cooled roof panel, and continuing operation of the furnace.

20 Claims, 10 Drawing Sheets

(51) Int. Cl.
*F27B 3/24* (2006.01)
*F27B 3/08* (2006.01)
*F27D 11/08* (2006.01)
F27D 9/00 (2006.01)
F27D 1/16 (2006.01)
F27D 1/18 (2006.01)

(52) U.S. Cl.
CPC .... *F27D 1/1816* (2013.01); *F27D 2001/1605* (2013.01); *F27D 2001/1825* (2013.01); *F27D 2009/0013* (2013.01)

(58) Field of Classification Search
CPC ..... F27D 2009/0016; F27D 2009/0018; F27D 2009/0021; F27D 2009/0051; F27D 2009/004; F27D 2009/0056; F27D 2001/1605; F27D 2001/1825; F27B 3/065; F27B 3/085; F27B 3/16; F27B 3/24
USPC ................ 373/60, 71–74, 78, 102, 103, 108
See application file for complete search history.

(56) References Cited

U.S. PATENT DOCUMENTS

| | | | |
|---|---|---|---|
| 1,844,407 A | 2/1932 | Murray | |
| 2,239,662 A | 4/1941 | Bailey | |
| 2,829,972 A | 4/1958 | Klement | |
| 3,294,162 A | 12/1966 | Loehlein et al. | |
| 3,706,343 A | 12/1972 | Saiga et al. | |
| 3,725,056 A | 4/1973 | Ingerson | |
| 3,849,587 A | 11/1974 | Hatch et al. | |
| 4,033,561 A | 7/1977 | Dhelft | |
| 4,054,174 A | 10/1977 | Haller | |
| 4,097,679 A | 6/1978 | Fukumoto et al. | |
| 4,122,295 A | 10/1978 | Nanjyo et al. | |
| 4,135,575 A | 1/1979 | Gersch | |
| 4,192,258 A | 3/1980 | Touze | |
| 4,207,060 A | 6/1980 | Zangs | |
| 4,221,922 A | 9/1980 | Okimune | |
| 4,327,899 A | 5/1982 | Suzuki et al. | |
| 4,337,824 A | 7/1982 | Kirk | |
| 4,351,055 A | 9/1982 | Bick et al. | |
| 4,455,017 A | 6/1984 | Wunsche | |
| 4,458,351 A | 7/1984 | Richards | |
| 4,559,011 A | 12/1985 | Gritsuk et al. | |
| 4,589,938 A | 5/1986 | Drosdick | |
| 4,644,558 A | 2/1987 | Kerr | |
| 4,658,761 A | 4/1987 | Duggan | |
| 4,694,864 A | 9/1987 | Libin | |
| 4,813,055 A * | 3/1989 | Heggart | F27B 3/24 373/74 |
| 4,849,987 A * | 7/1989 | Miner, Jr. | F27D 1/1816 373/74 |
| 4,871,014 A | 10/1989 | Sulzberger | |
| 4,972,903 A | 11/1990 | Kwok | |
| 5,241,559 A | 8/1993 | Hixenbaugh | |
| 5,289,495 A | 2/1994 | Johnson | |
| 6,038,246 A * | 3/2000 | Shimizu | F27B 3/10 373/78 |
| 6,059,028 A | 5/2000 | Kincheloe et al. | |
| 6,330,269 B1 | 12/2001 | Manasek et al. | |
| 6,334,484 B1 | 1/2002 | Kandel | |
| 6,563,855 B1 | 5/2003 | Nishi et al. | |
| 6,890,479 B2 | 5/2005 | Manasek et al. | |
| 7,895,957 B2 | 3/2011 | Inomata et al. | |
| 2004/0194940 A1 | 10/2004 | Manasek et al. | |

FOREIGN PATENT DOCUMENTS

| | | |
|---|---|---|
| DE | 8807171 U1 | 9/1988 |
| DE | 4021250 A1 | 1/1991 |
| DE | 9103291 U1 | 11/1991 |
| FR | 2336648 A1 | 7/1977 |
| GB | 1088827 A | 10/1967 |
| JP | 55-002558 A | 1/1980 |
| JP | 60-049840 A | 3/1985 |
| JP | 61-268956 A | 11/1986 |
| JP | 2001-194070 A | 7/2001 |
| WO | 86-02436 A1 | 4/1986 |
| WO | 0163193 A1 | 8/2001 |
| WO | 2006111315 A1 | 10/2006 |

OTHER PUBLICATIONS

Metals Handbook, 8th Edition, vol. 1, Properties and Selection of Metals, Published by American Society for Metals, pp. 960-963, 970, 971, 976, 980, 981, 984-990, 1002, 1033-1037.

European Patent Office; Extended European Search Report issued in connection with European Patent Application No. 08756385.4; dated Dec. 11, 2012.

European Patent Office; Communication pursuant to Article 96(2) EPC issued in connection with European Patent Application No. 01909161.0; dated Nov. 12, 2004.

European Patent Office; Communication pursuant to Article 96(2) and Rule 51(2) EPC issued in connection with European Patent Application No. 01909161.0; dated Jun. 9, 2005.

International Preliminary Report on Patentability and Written Opinion of International Searching Authority, Korean Intellectual Property Office, 10 pages, dated Aug. 8, 2019.

* cited by examiner

TOP LOADING ROOF FOR ELECTRIC ARC, METALLURGICAL OR REFINING FURNACES AND SYSTEM THEREOF

RELATED APPLICATIONS

The present application claims the benefit of U.S. Provisional Patent Application Ser. No. 62/452,061, filed Jan. 30, 2017, the disclosure of which is hereby incorporated by reference in its entirety.

FIELD OF THE DISCLOSURE

The present disclosure relates generally to a method and to an apparatus for extending the operational life of electric arc furnaces, metallurgical furnaces, including metal smelting and refining furnaces. In particular, the disclosure relates to water-cooled panels mountable to the roof of a furnace in a manner that enables replacement of the panels in a short period of time without removing the roof from the furnace. The present disclosure avoids dropping the roof panel down into the roof structure and is an improvement to the conventional method which is difficult and unsafe.

BACKGROUND

An electric arc furnace (EAF), like most metallurgical furnaces, is a furnace that heats charged material by directly exposing the charged material to an electric arc to heat the material up to about 1,800° C. (3,272° F.). FIG. 1 shows a typical industrial arc furnace which can range in size from approximately one ton capacity (used in foundries for producing cast iron products) to about 400 ton units used for primary steelmaking. FIG. 2 shows an example of a roof panel top loading system with the roof removed for charging and FIG. 3 shows the roof panel being replaced so that melting, material additions, slagging and tapping can resume. For the purposes of description, the following uses the EAF as the basis, however, the following discussion is applicable as well to all other types of metallurgical furnaces and refining furnaces.

The furnace roof must be protected from heat stress, arcing and general operational damage. Cooling panels may provide some protection from these harmful conditions. Damage or worn water cooling panels may result in water leaking into the furnace which could result in disassociation of water into the elements of hydrogen and oxygen. Once the hydrogen and oxygen molecules re-unite there is the potential for a radical exothermic reaction and explosion. In the event of such damage the furnace operation is halted and hours of unscheduled furnace down time are needed to affect the repair.

There are generally several methods for repairing water cooled roofs for electric arc furnace operation. Known roof designs have the disadvantage of requiring shut down of the furnace to repair or maintain the roof and replace roof panels. The current time consuming repair/replacement requirements mean that operators lose valuable time for production of liquid steel. The bottom line profit losses can be in the hundreds of thousands of US Dollars per hour downtime.

For example, a method of designing a water cooled roof is to build the unit in one monolithic piece. This has the advantage of eliminating the structure that holds the panels thereby making the roof less expensive. The disadvantage is that you must change the entire roof when a section or a pipe becomes damaged.

Another method of designing the roof is to build one monolithic structure and cool it with sprayed water. The claimed advantage of this roof is the water system is not pressurized. If leaks develop, water is not sprayed into the operating furnace under pressure. However, water can enter the furnace and is subject to the same explosive properties as a pipe design roof panel. The disadvantage of this roof is its ability to stand up against high heat loads which results in excessive stress cracking of the hot face plate and constant repair requirements. In high temperature furnaces, the spray cooled roof tends to prematurely crack and fail. The roof must then either be removed or repaired causing substantial unscheduled downtime.

The disadvantages of all the above types of roofs are the amount of unscheduled and scheduled downtime required to change a panel, change the entire roof, or repair a fracture in the plates of a spray roof. Additional problems result from clearance restrictions between the roof structure and the lifting mechanism for the roof structure (gantry design or single point lift design). In the above-noted designs there is no ability to raise the roof panel away from the harsh radiation environment of the molten steel bath in the furnace and to avoid the arcing that is occurring during scrap melting and during steel refining.

SUMMARY OF THE DISCLOSURE

The present disclosure includes a method to enhance the development of quick changing of a damaged portion of the electric arc furnace roof by designing the roof panel to be "raised" away from the harsh environment inside the furnace. These enhancements to a top loading roof are significant because it will increase the operating life of the roof panel and it will move the roof panel away from the furnace environment that causes damage to the roof panel hot face. This solution takes into account the safety of the personnel that would be performing the repair. One objective is to add this raised roof panel design to a top loading roof system whereby the roof panel will have a much extended operating life and, in the event of roof panel damage, a damaged roof panel can be replaced within one hour or less, if needed.

In addition, there is disclosed an enclosed water cooled wire way and water cooled junction box which allows for safe, accurate and consistent measurement of water temperatures during furnace operation. The temperature measuring devices and related wiring are protected from damage and destruction by the hostile furnace environment to assure trouble free operation of the temperature measuring system.

The water cooled wire way and adjoining water cooled protective housings can also protect any accessories, equipment or devices that monitor and/or control and/or adjust the operation of the furnace on board the roof or roof structure against the severe heat, radiation and harsh furnace environment so that efficient and successful equipment operation can be maintained. In most instances, such devices cannot be and are not located on the furnace because of the harsh environment. This is a dramatic improvement since the control devices can be located closer to the measuring location to assure that more accurate data can be collected and controlled.

In one embodiment of the present disclosure, a method of replacing a damaged portion of a furnace roof of a metallurgical or refining furnace includes providing the metallurgical or refining furnace with a top loading roof panel system having a top loading roof structure comprising roof support beams and a plurality of panels coupled to and supported by the beams; removing a first panel of the plurality of panels from the roof support beams by lifting it from the roof structure; replacing the first panel with a second panel; and coupling the second panel to the roof structure so that it is supported below the top of the roof support beams and is located to protect the underside hot face of the roof support beam.

In one example of this embodiment, the top loading water cooled roof panel is pie-shaped. In a second example, the top loading water cooled roof panel includes a pie-shaped water cooled panel. In a third example, the top loading water cooled roof panel is supported below the top of roof support beams at a height from the base of the beam to the top of the roof support beams. In a fourth example, the method includes providing at least one quick water disconnect for connecting the at least one top loading water cooled roof panel to a water supply. In a fifth example, the method includes providing another quick water disconnect for connecting the at least one top loading water cooled roof panel to a water return.

In another method of this embodiment, the step of removing the at least one top loading water cooled roof panel includes raising the at least one top loading water cooled roof panel to remove it from the top loading roof structure. In a further example, the method includes sizing the top loading water cooled roof panel so that it will fit through space between the roof support beams. In yet a further example, the top loading water cooled roof panel is raised away from the bottom of the roof support beam up to the top of the roof support beam.

In another embodiment of this disclosure, a method of replacing a damaged portion of a furnace roof for a metallurgical or refining furnace includes providing a metallurgical or refining furnace comprising a top loading roof panel system, the system having a top loading roof structure including roof support beams extending at least one of radially, horizontally and vertically; providing a plurality of roof panels coupled to the roof structure so that each of the plurality of roof panels is supported below the top of the roof support beam and is located to protect the underside hot face of the roof support beam; removing a first top loading water cooled roof panel from the roof structure; repairing the first top loading water cooled roof panel; and replacing the repaired first loading water cooled roof panel to the roof structure.

In a further embodiment of this disclosure, a roof assembly for a metallurgical or refining furnace includes a roof structure formed by an inner support beam, an outer support beam, and a plurality of radially-extending support beams coupled between the inner and outer support beams; a plurality of panels coupled to the roof structure and supported below the support beams, the plurality of panels disposed in a location to protect the underside of the roof structure; a water cooling structure coupled to an underside of at least one of the plurality of panels, the water cooling structure being in fluid communication with at least one quick water disconnect coupled to the panel, the water disconnect and water cooling structure further fluidly coupled to a water supply and a water return located to protect the roof structure and positioned away from a liquid metal bath in the furnace.

In one example of this embodiment, at least one quick-electrical disconnect fixture is coupled to the at least one water-cooled panel. In a second example, a water cooled wireway may be provided to protect temperature sensing devices and wiring carrying the temperature data to a water cooled junction box. In a third example, process monitoring equipment is disposed on the furnace roof. In a fourth example, the plurality of panels comprises a pie-shaped panel. In a fifth example, at least one quick water disconnect is provided for connecting the plurality of panels to the water supply.

In a sixth example, each of the plurality of panels comprises one or more lugs for lifting the panels from the roof structure. In a seventh example, the water cooling structure comprises a sinusoidal pipe through which water passes, the pipe including at least one 90° or 180° elbow. In an eighth example, each of the plurality of panels comprises a top portion and a side portion, where the side portion aligns with the outer support beam. In a further example, the roof structure defines an opening between the inner support beam, the outer support beam, and at least two of the radially-extending support beams, the opening configured to receive one of the plurality of panels.

DETAILED DESCRIPTION

In an electric arc furnace (EAF), a portion above a hearth or smelting area must be protected against the high internal temperatures of the furnace. The EAF vessel wall, cover or roof and duct work are particularly at risk from massive thermal, chemical, and mechanical stresses caused by charging the steel. Such stresses greatly limit the operational life of the furnace. The EAF is generally designed and fabricated as a welded steel structure which is protected against the high temperatures inside the furnace vessel by a refractory lining and water cooled panels. Water-cooled roof panels and water-cooled sidewall panels are located in portions of the furnace vessel above the melting/smelting area of the furnace.

In addition, furnace off-gas ducts are also comprised of a plurality of pipe around its circumference that protect the ductwork from the high temperatures and caustic gases produced during furnace operation. Existing water-cooled panels and ducts are made both with various grades and types of plates and pipes. Using water-cooled panels reduces refractory costs, enables steel makers to operate each furnace for a greater number of heats and enables the furnaces to operate at increased levels of power and chemical energy input. Such panels are designed to incorporate a plurality of pipes in serpentine fashion and hung on the inside wall of the electric arc furnace above the hearth, thereby forming a cooling surface between the interior and the furnace wall.

It is important to maintain a layer of slag on the hot side of the water cooled panels to protect the panels from thermal and arcing degradation during normal furnace operation. Slag cups, slag bars, slag pins and specially designed extruded pipe with splines on the hot side surface of the pipe may be used to retain splattered slag on the hot side surface of the panels. Slag solidifies on the pipes, forming an insulation barrier between the molten iron material and the cooling pipes and, consequently, the wall of the furnace.

Figure 10:
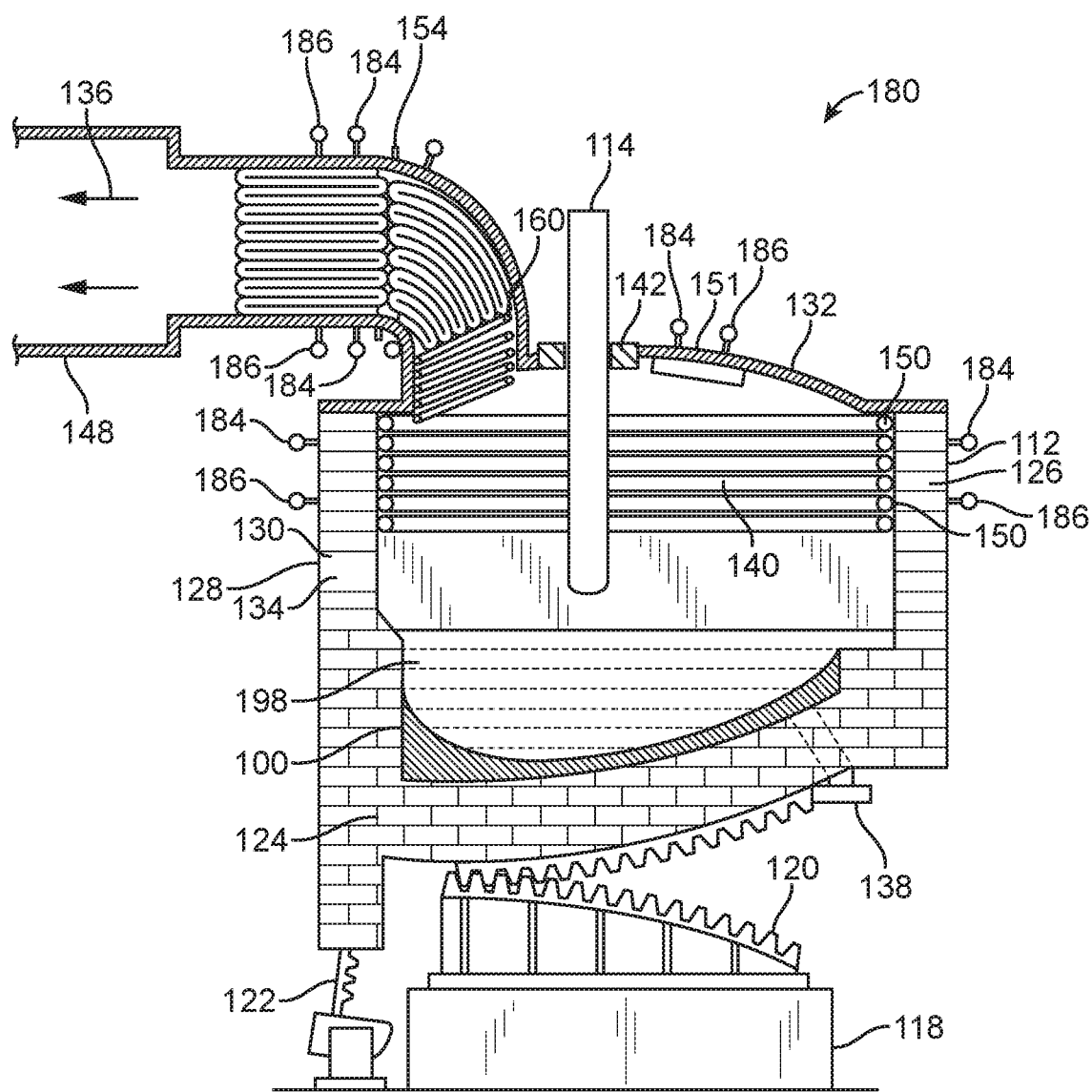
FIG. 10 is a cross-sectional schematic of a steel-making furnace which includes the roof panel of FIG. 2.

Referring to FIG. 10, one embodiment of a furnace is illustrated as an EAF type furnace 180. While the EAF is disclosed as one example, it is understood the principles and teachings of the present disclosure may be readily applied in a basic oxygen furnace (BOF) and the like. In FIG. 10, an EAF 180 may include a furnace shell 112, a plurality of electrodes 114, an exhaust system 116, a working platform 118, a rocker tilting mechanism 120, a tilt cylinder 122, and an off gas chamber. The furnace shell 112 may be movably disposed upon the rocker tilt 120 or other tilting mechanism. Further, the rocker tilt 120 may be powered by the tilt cylinder 122. The rocker tilt 120 may also be further secured upon the working platform 118.

The furnace shell 112 may include a dished hearth 124, a generally cylindrical side wall 126, a spout 128, a spout door 130, and a general cylindrical circular roof 132. The spout 128 and spout door 130 are located on one side of the cylindrical side wall 126. In the open position, the spout 128 may allow intruding air 134 to enter the hearth 124 and partially burn gasses 136 produced from smelting. The hearth 124 is formed of a suitable refractory material. At one end of the hearth 124 is a pouring box having a tap means 138 at its lower end. During a melting operation, the tap means 138 is closed by a refractory plug, or a slidable gate. Thereafter, the furnace shell 112 is tilted, the tap means 138 is unplugged, or open and molten metal is poured into a teeming ladle, tundish, or other device, as desired.

The inside wall 126 of the furnace shell 112 may be fitted with water cooled panels 140 of sinuously winding piping 150. The panels, in effect serve as an interior wall in the furnace 180. The manifolds, which supply cool water and a return, are in fluid communication with the panels 140. Typically, the manifolds are positioned peripherally in a fashion similar to the illustrated exhaust ducts 144.

The heat exchanger system 110 produces a more efficient operation and prolongs the operation life of the EAF furnace 110. In one illustrative embodiment, the panels 140 may be assembled such that the sinuously winding piping has a generally horizontal orientation. The piping 150 can be linked with a linkage or have a base that is mounted to the wall. Alternatively, the panels 140 can be mounted such that the sinuously winding piping 150 has a generally vertical orientation. The upper ends of the panels 140 may define a circular rim at the upper margin of the side wall 126 portion of the furnace 180.

The heat exchanger system 110 can be fitted to the roof 132 of the furnace 180, wherein the water cooled panels 140 have a curvature that substantially follows the domed contour of the roof 132. The heat exchanger system 110 may be deployed on the inside of side wall 126 of the furnace 180, the roof 132 and the entrance of the exhaust system 116, as well as throughout the exhaust system 116. As such, the heat exchanger system 110 can protect the furnace and cools the hot waste gasses 136 as they are ducted to a bag house or other filtering and air treatment facilities, where dust is collected and the gasses are vented to the atmosphere.

In operation, hot waste gasses 136, dust and fumes are removed from the hearth 124 through a vent 146 in the furnace shell 112. The vent 146 may be in communication with an exhaust system.

The panel 140 can have a plurality of axially arranged pipes 150. U-shaped elbows can connect adjacent sectional lengths of piping or pipes 150 together to form a continuous piping system. Linkages and the like that additionally serve as spacers may be between adjacent pipes 150, and they provide structural integrity of the panel 140 and are determinative of curvature to the panel 140.

The heat exchange system or heat exchanger 110 may include at least one panel of the sinuously winding piping 150 having an inlet (not shown) and an outlet (not shown), an input manifold in fluid communication with the inlet of the at least one panel, an-output manifold in fluid communication with the outlet of the at least one panel, and a cooling fluid flowing through the piping 150. The heat exchanger system 110 cools hot fume gasses 136 and dust that is being evacuated from the metallurgical furnace 180 and its supporting components. The piping is an assemblage of sectional lengths of connected tubes mounted side-by-side, wherein the connected tubes are secured to each other with the linkage, therein forming the at least one panel 150.

It has been determined that one illustrative and desirable composition for fabricating the piping 150 is of an aluminum bronze alloy. Aluminum bronze alloys have been found to have a higher than expected thermal conductivity, resistance to etching by the stream of hot gasses (modulus of elasticity), and good resistance to oxidation. Thus, the operational life of the heat exchanger is extended. Corrosion and erosion of the heat exchanger and related components is reduced, when they are fabricated with aluminum bronze. Aluminum bronze has thermal conductivity that is 41% higher than P22 (about 96% Fe, 0.1% C, 0.45% Mn, 2.65% Cr, 0.93% Mo) and 30.4% than carbon steel (A106B). The heat exchangers fabricated using aluminum bronze and alloys thereof are more efficient, and have a longer operational life than furnace constructed of refractive materials and or other metal alloys.

It has also been determined that the piping 150 may be extruded, and that extruding may help the piping resist corrosion, erosion, pressure, and thermal stress. The piping can be curved or bent to match the curvature of a wall to which it is being attached, if so needed. More typically, the individual sections of piping are secured to each other with an angled linkage such that the resulting panel has a curvature that is comparable to the curvature of the wall.

In the embodiment of FIG. 10, the sinuously winding piping 150 may be formed by a plurality of longitudinal piping sections in which two of the piping sections are connected by an elbow. It is often difficult to assemble these sections to the elbows, and this disclosure provides one such arrangement to better facilitate and improve the welding process.

Figure 1:
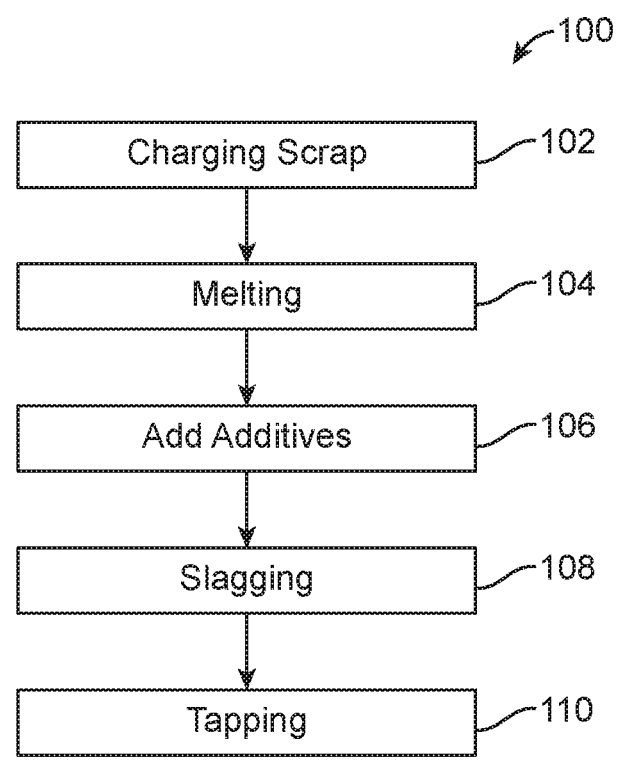
FIG. 1 illustrates a flow diagram of a melting process in a metallurgical furnace.

Referring to FIG. 1, an overview of a melting process in a furnace such as the one shown in FIG. 10 is presented. The melting process 100 may include a plurality of blocks or steps for performing the operation. Here, a first block 102 is shown in which scrap may be charged. To do so, the roof of the furnace may be pulled or moved away such that a charging bucket may dump scrap into the furnace. In a second block 104, the roof may be closed and electrodes may be brought into the furnace to heat the scrap and melt it into molten steel. In a third block 106, additives may be added to the furnace to assist with the melting process 100. For example, a side door of the furnace may be opened so that oxygen or carbon may be blown or otherwise added into the furnace to assist with the melting.

After block 106, the melting process 100 may advance to block 108 where a slagging step is executed. Here, the furnace may be tipped in one direction to remove waste material from the top of the molten liquid and collect the slag in a slag pot. Here, a decarburizing process may also be implemented to remove carbon or reduce the carbon content from the furnace. In a fifth block 110, a tapping step may be executed where the furnace is tilted in a direction opposite from the slagging step. Here, the molten liquid may be poured into a ladle where it is later processed.

In a first embodiment of the present disclosure, a method is disclosed to build a cooling structure made of a plurality of pipe and/or plate and then attach such cooling structure to furnace roof structure. The furnace roof structure may include a plurality of generally pie-shaped roof panel segments or panels 1 that enable quick removal and replacement of each segment or panel whereby maintenance time for repair or replacement of roof structure is minimized. Metallurgical and refining furnaces having a shape that is, for example, rectangular, obround or a combination thereof may have panels that are square, pie-shaped or any appropriate shape.

In a conventional roof structure of a metallurgical furnaces, the roof structure is built from within the furnace and lifted to the top thereof for assembly. It may be held in place by a bolting system or other assembly means. The downside with this arrangement is that when an issue arises with the roof panel or cooling pipe coupled on the underside thereof, the furnace must be shut down so that the roof can be worked on. If the roof must be replaced, this further increases the downtime.

Figure 2:
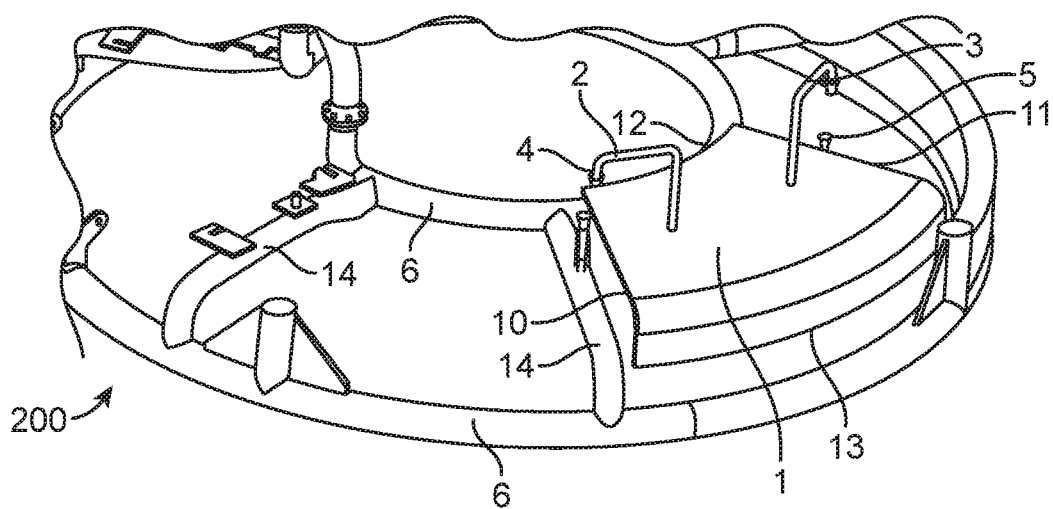
FIG. 2 is a perspective view of a section of support structure for the roof of an electric arc furnace with a generally pie-shaped roof panel section being lowered into operational position in accordance with the disclosure.

In the present disclosure, however, this is avoided because the roof structure is divided into separate segments or panels. Each roof panel 1, as shown in FIG. 2, is separate from the other panels and can be independently removed from the roof. In other words, a single segment or panel may be removed while the rest of the roof remains in place. This allows for less downtime and more efficient and productive use of the furnace.

A EAF roof panel might be a pie-shaped panel segment which is, for the purposes of the present disclosure, defined as a generally planar section having two converging linear sides and arcuate sides closing the ends of the converging linear sides.

In this disclosure, the improved furnace roof structure includes at least one panel 1 that is lifted above the remaining furnace roof, repaired or replaced and then returned into its place in the roof to close the roof and resume operation of the furnace. In accordance with the present disclosure a panel 1 may be removed from the furnace roof without loss of time for removing or otherwise disrupting roof supports 6. As shown in, for example, FIGS. 2-6, a roof 200 of a furnace includes the roof support structure 6 designed to facilitate removal of one or more generally pie-shaped roof panels 1. The furnace roof structure includes a panel 1 that is raised away from the furnace bath six inches or more (depending on the design of the roof structure and the depth of the roof structure spokes).

Figure 7A:
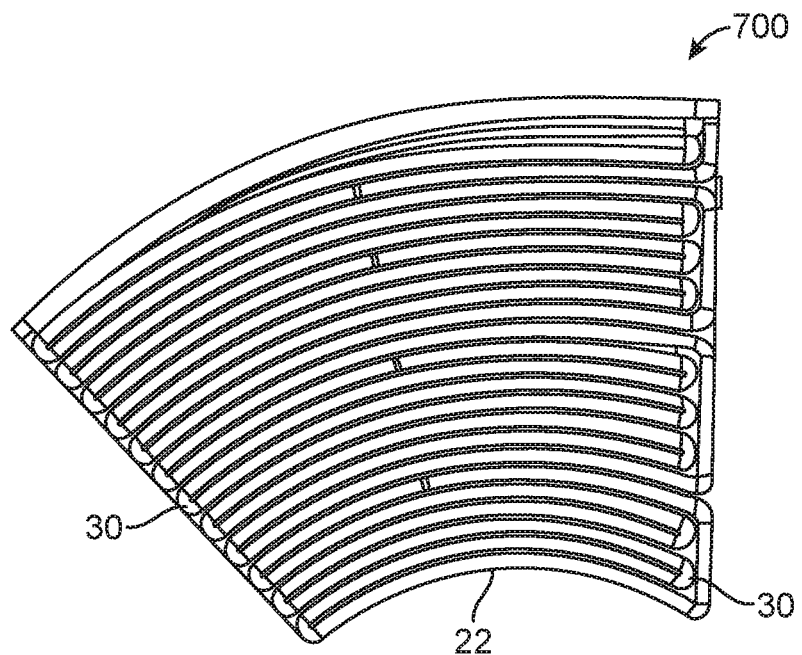
FIG. 7A depicts a plan view of cooling panel structure that may be attached to the underside of a generally pie-shaped roof section.
Figure 7B:
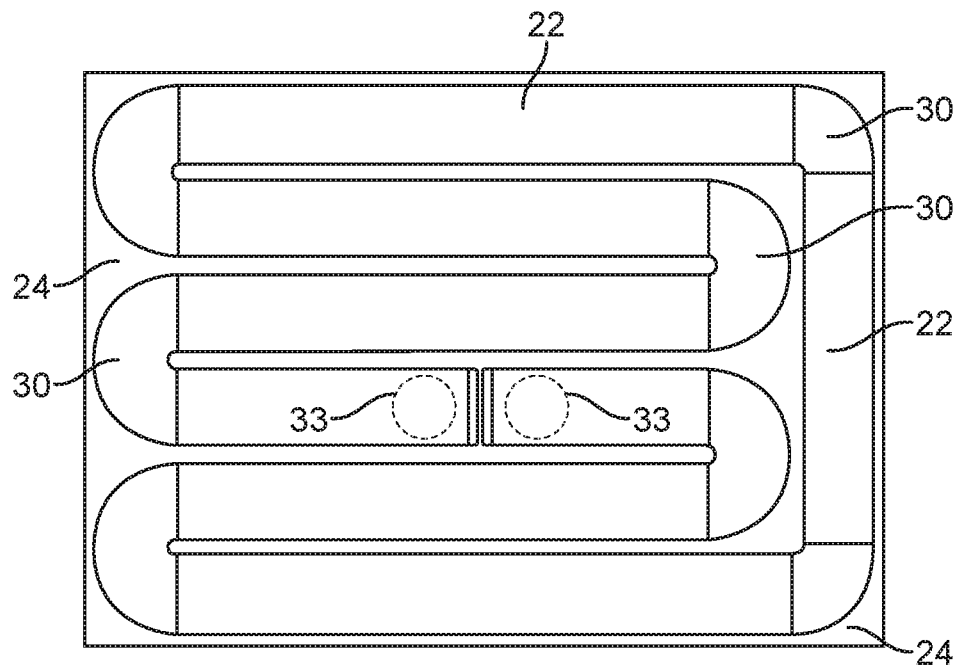
FIG. 7B depicts a plan view of an example of cooling panel structure for use in the generally pie-shaped roof section of FIG. 7A.
Figure 8:
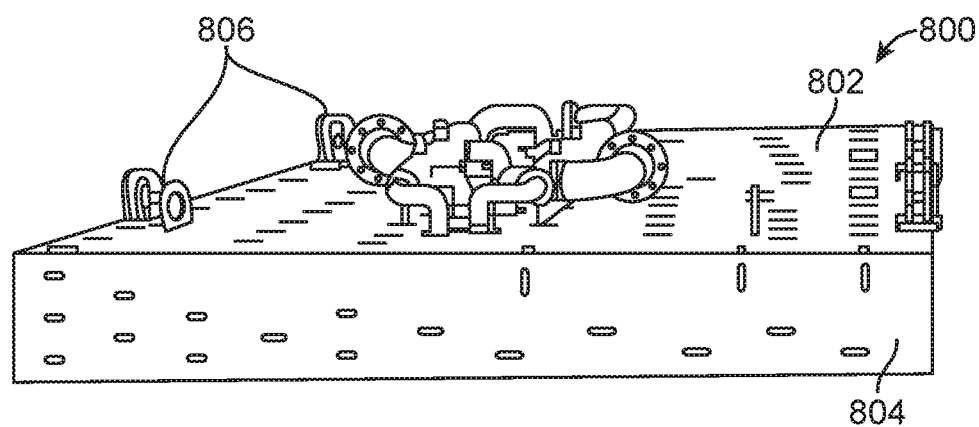
FIG. 8 is a perspective view and showing the top of a roof panel.
Figure 9:
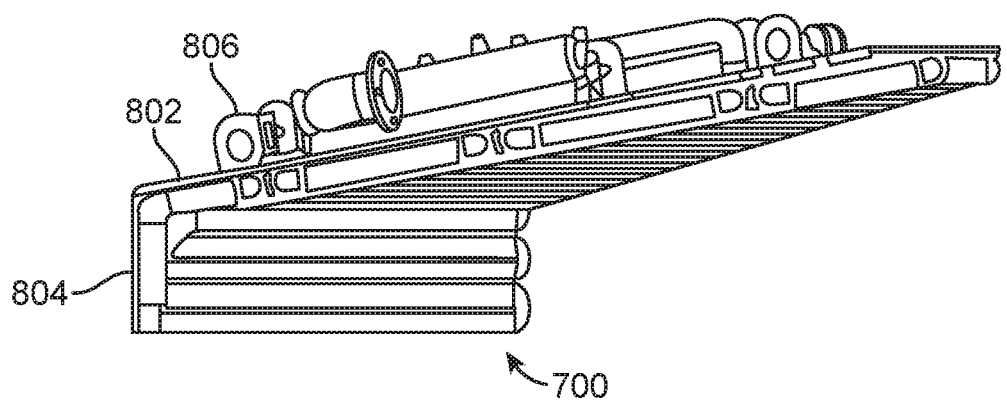
FIG. 9 is a perspective view of a roof panel showing the cooling panel structure on the bottom of the roof panel.

The roof panel may be pulled up from the top of the roof structure for removal. In FIG. 8, for example, lugs 806 may be mounted to a top surface 802 of a roof panel 800, and a chain or other mechanism may fasten to the lugs to lift the panel 800 from the roof structure. The roof panel 800 may further include a side portion 804 that is angled with respect to the top surface 802. In one example, the side portion 804 may be angled at approximately a 90° angle with respect to the top surface 802. Head pipes and the like, as shown in FIG. 8, may further facilitate the transfer of water to a cooling pipe 700 located on the underside of the roof panel 800. This, for example, is shown in FIG. 9. The cooling pipe 700 is shown in greater detail in FIGS. 7A and 7B, and may be formed similarly to the pipe 140 in FIG. 10.

The pie-shaped roof panels are sized so that they will fit through the spokes 14 (radial beams) of the roof structure 6. The pie-shaped roof panels 1 are either designed to be flat or have a box design with straight sidewalls extending downwards from the flat raised panel to protect the roof structure outer ring 6, the roof structure spokes and the delta header structure. In the event the furnace design requires a flat roof panel (due to lifting clearance restriction) the spoke protection panels utilized in the top loading roof system are extended upwards around the spoke 14 to meet the flat raised roof panel. Automatic pressure sealing, quick water disconnects 4, 5 are used with these panels to speed the process of installing and removing the water connections. The water quick disconnects 4, 5 allow water to be transferred from a supply to the cooling panel 700 located on the underside of the panel 1. This compares favorably to manual connections resulting from the use of standard pipe fittings that require manual connection and disconnection.

In other words, in FIG. 2, each roof panel 1 may be designed to include quick connect and disconnect structure for a cooling water supply. Each generally pie-shaped segment includes a first linear side 10, a second linear side 11, an inner arcuate side 12 closing the inner circumferential end of the converging linear sides and an outer arcuate side 13 closing the outer circumferential ends of the diverging linear sides. Sides 10, 11 converge toward inner curved side 12 and sides 10, 12 diverge toward outer curved side 13. The outer curved side extends downward to protect the outer ring of the roof structure and to seal off-gases and flames within the furnace roof.

Figure 3:
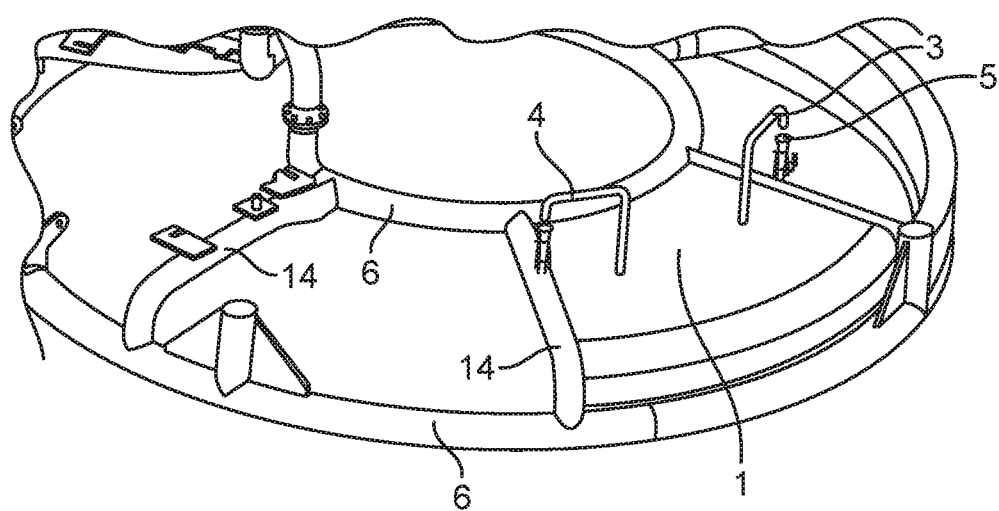
FIG. 3 is a perspective view of a section of support structure for the generally pie-shaped roof section of FIG. 2 lowered further toward its operational position in accordance with the disclosure.
Figure 4:
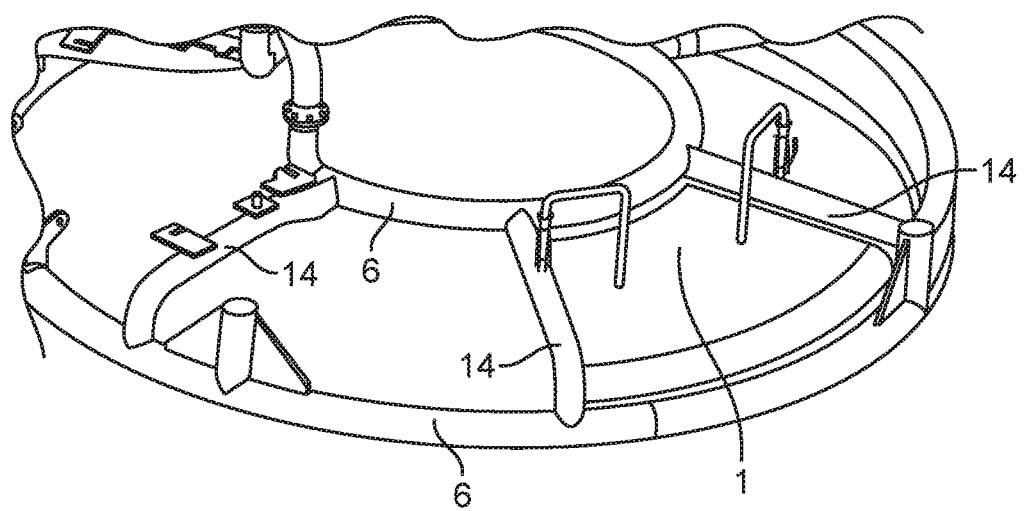
FIG. 4 is a perspective view of a section of support structure for the generally pie-shaped roof section of FIGS. 2 and 3 at its operational position in accordance with the disclosure.
Figure 5:
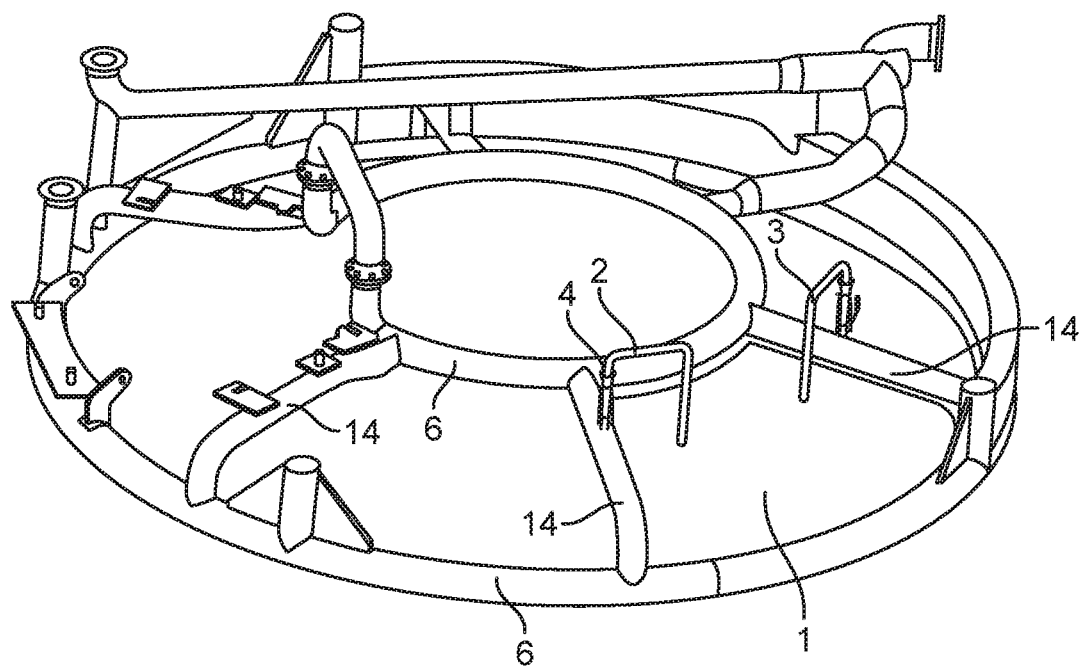
FIG. 5 is a perspective view of support structure and showing one generally pie-shaped roof section at its operational position in accordance with the disclosure.
Figure 6:
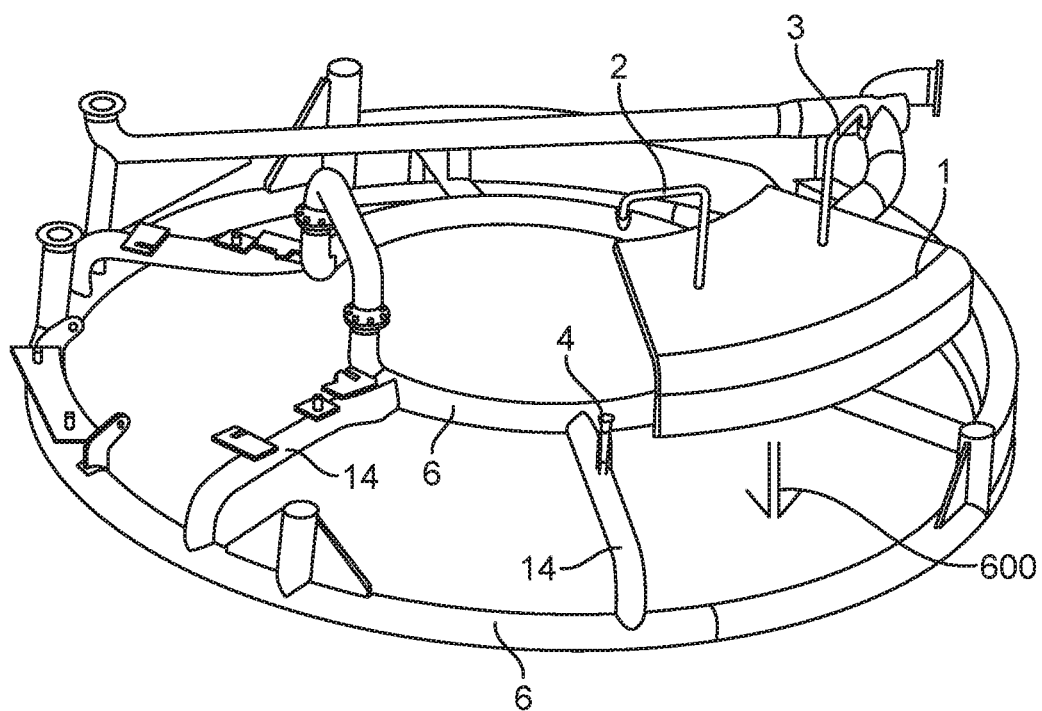
FIG. 6 is a perspective view of support structure and showing one generally pie-shaped roof section raised above the roof support structure.

FIGS. 2-4 show a water cooled roof design with generally pie-shaped panels 1. Pie-shaped roof panel 1 comprises a cooling structure 700 on the underside of the roof panel. A pipe 2 provides cooling water that flows through the roof structure to the cooling structure on the underside (furnace interior side) of roof panel 1. Water flows from the cooling structure on the underside (furnace interior side) of roof panel 1 outward through pipe 3. The cooling structure (see, for example, the structure shown in FIG. 7A) on the underside (furnace interior side) of roof panel 1 allows for protection of the roof structure from the above-noted heat stress, arcing and general operational damage.

As noted above, the design of roof panel 1 allows it to be removed for routine maintenance or when it is damaged and needs repair. A panel 1 is removed from the furnace roof by raising it from the top of the furnace roof structure and then lowering (sequence as seen in FIGS. 2-4) a new or repaired panel 1 into operating position in the roof structure. The weight of the panel will force a secure water supply and return connection. In addition, the panel 1 may be further forced downward 600 using an overhead crane or other equipment to assure that the panel seating is secure. While the panel is held in the secured position, a wedge/pin attachment assembly (e.g., shown in FIGS. 2-6 on the left-most spoke 14) may be engaged to keep the panel in position during furnace operation. This compares to having to take the entire roof assembly off-line from the furnace, dropping the damaged panel from the roof structure, replacement panels having to be installed off line, placed on the ground, the roof structure placed over top of the panels and then the panels being manually pulled upwards to seat them against the spokes of the roof structure.

As discussed above, water cooling structure (e.g., the structure shown in FIG. 7A) is located on the underside of each generally pie-shaped panel 1. An example of details of such cooling structure is depicted in FIG. 7B wherein cooling tubes comprising half-tubes or pipes 22 which may be mounted to a plate 24 or may be constructed from a plurality of pipe and may be connected to form an illustrative closed loop cooling circuit which illustratively may be configured in a single parallel flow configuration as depicted in FIG. 7B. The cooling circuit depicted in FIGS. 7A and B includes a return configuration whereby cooling tubes 22 are illustratively interconnected by connecting pieces such as, for example, and without limitation 180-degree returns and or 90-degree elbows 30. The elbows 30 may be rounded as shown in FIG. 7B, or they may be mitered, etc. (not shown). The tubes/elements will be in fluid communication with cooling fluid supply and return sources 33 which are in fluid flow connection with pipes 2, 3 and quick disconnects 4, 5.

In FIG. 2, water supply pipe 2 feeds water to the underlying cooling panel structure 700 and pipe 3 enables water to flow from the underlying cooling structure 700. Water supply is provided through the furnace support structure 6 and flows to quick disconnect fixture 4 which connects to pipe 2. Water is removed from the underlying cooling panel structure through the furnace support structure 6. That is, water leaves the underlying cooling panel structure 700 and flows through pipe 3 to quick disconnect 5 and into piping in furnace support structure 6. Accordingly, cooling water flows from piping associated with the furnace roof support structure 6 through a quick connect/disconnect fixture 4 to piping 2 feeding cooling water to the cooling panel structure (plurality of pipes, baffles, etc.) underlying a generally pie-shaped roof panel 1 and then such cooling water is removed via flow through quick connect/disconnect fixture 5 to piping 3 feeding spent cooling water for removal via piping in furnace support structure 6.

The quick disconnects 4, 5 are depicted in FIGS. 2-4 wherein, for example, a rigid arched or right angle pipe connection assembly is shown. As seen, the end of pipe 2 has a generally frustoconical shape such that it is adapted to slide into complimentary shaped quick disconnect 4. Joining of the complimentary surfaces of the quick disconnect 4 and the frustoconical end of pipe 2 may be facilitated by providing a circumferential slot in either of the frustoconical end of pipe 2 or in the complimentary surface of the quick disconnect 4 whereby upon during joining of the parts an O-ring on one of the parts will fit into the slot in the other complimentary part to seal the parts being joined. The parts being joined are advantageously made of high temperature material such as neoprene, bronze or other similar material. The quick disconnect 4 (or 5) enables disconnection by simply lifting one of the complimentary shaped portions so that it separates and disconnects from the other complimentary shaped portion. As noted above, rejoining of complimentary shaped portions may occur by virtue of the weight of the panel being lowered into place in the furnace roof 200 and forcing a secure water supply and return connection. Pressure relief valves and temperature sensors may be provided on the outlet side of each panel 3 to avoid temperature and/or pressure overload in the water flow system.

In today's modern steel mill, it is imperative that the primary steel making furnace be up and running as much as possible with little or no downtime. It is critical to measure temperature in the respective panels and circuits to assure that preventive actions can be taken during operation to avoid catastrophic equipment failure or water leaking into the furnace.

The above-discussed furnace and roof panel 1 require monitoring of the incoming and outgoing water temperature of each circuit or panel 1 in order to maintain proper cooling of the roof panel. Maintaining proper cooling water flow and water temperature is very difficult due to the high temperature, and extremely dirty environment on the furnace roof. The furnace roof 200 is subject to scrap and dust damage during operation and high heat radiation from the electrodes that operate in the center of the furnace and hot gases that escape between the panels 1, and various openings around the furnace roof structure comprising the water cooled roof. During normal operation wiring and temperature sensing devices located on top of the roof structure are damaged and/or destroyed.

Adding any accessories, equipment or devices to monitor, control, and/or adjust the operation of the furnace on board the roof or roof structure is difficult due to the high temperature and aggressive conditions on top of the roof during furnace operation. No equipment can survive the heat and harsh conditions. Accordingly, the presently disclosed water cooled roof panel includes appropriate electrical connection equipment for connection to electrical monitoring equipment. Such electrical connection equipment may include wire ways (circuitry), one or more junction boxes, thermocouples, etc. The electrical connection equipment includes quick disconnect devices (similar to quick disconnects 4, 5) for disconnection from and reconnection to the electrical monitoring equipment when a roof panel 1 is removed and replaced. The water cooled wire way system with water cooled junction boxes are a new development to protect the electrical system components such as wiring and temperature sensing devices from damage due to the harsh environment on top of the furnace roof structure. In addition, water cooled housings are incorporated into the water cooled wire way system to protect process equipment required to monitor furnace operating conditions so that the operating data can be monitored while the furnace is operating and used by operators to maintain safe and efficient furnace operations.

Moving roof panels away from the hostile furnace environment for repair or replacement has a dramatic positive effect on the longevity and of the roof panels. Repair of a damaged or wearing panel 1 during operation permits less unscheduled downtime with significant less profit losses.

Reducing the size of the pie-shaped panels 1 leaves the spokes 14 and delta support sections 6 of the roof structure exposed. Installation of a device on the hot side of the roof structure spokes and delta support header that is highly resistant to damage and may protect the spokes from damage due to extreme radiant heat and arcing. This may be implemented by using panels manufactured from any type of material such as steel pipe, plate, copper plate, copper plate with slag retaining devices, copper high velocity pipe panels (HVC Pipe), or heavy walled copper pipe with a nominal diameter of 2" or more. High velocity water flow in the pipe makes it resistant to the extreme high heat fluxes and arcing that can be present during the operation of an electric arc furnace.

In another embodiment, each panel may comprise a copper high velocity plate panels having heavy walled copper of 0.25 inches thickness or more. High velocity water flow in the copper plate panel makes it resistant to the extreme high heat fluxes and arcing that can be present during the operation of an electric arc furnace. This copper plate panel can also be an integral part of the hot side of the spoke when the spoke is a plate design structure.

In a further embodiment, copper spline panels may be designed to have moderate water flow for dealing with high heat flux. However, the splines on the hot face of the pipe (either extruded into the pipe or welded onto the pipe) maintain a protective coating of slag (a by-product of the steelmaking operation). The splines on the hot face of the pipe cool and mechanically hold a layer of slag in place to insulate the panel hot face from electrical damage due to arcing and heat stress damage.

In yet another embodiment, the panels may be formed of AmeriSpline® steel designed to have moderate water flow for dealing with high heat flux. However, the splines on the hot face of the pipe (either extruded into the pipe or welded onto the pipe) maintain a protective coating of slag (a byproduct of the steelmaking operation). The splines on the hot face of the pipe cool and mechanically hold a layer of slag in place to insulate the panel hot face from electrical damage due to arcing and heat stress damage.

The roof structure spoke 14 and delta header 6 protecting panels will be attached to the underside (hot face) of the spokes to provide the above described protection. Water inlets and outlets protrude up through the spokes and the delta header and are independent of the pie-shaped water panels 1. All of the above spoke protection panels have extensive heat transfer and arc resistance characteristics that allow the panels to survive in the most difficult of electric arc furnace areas.

Installation and support of the replacement panels is of significant importance to achieving the goal of replacing a damaged roof panel in one hour or less. The operating life of a panel may increase significantly if it is raised quickly away from the furnace environment and a replacement is promptly put into place in the furnace roof.

Metallurgical and refining furnaces can benefit from locating process monitoring equipment (e.g. off gas composition measuring instrumentation) on the furnace roof structure. Until today this has not been possible because of the harsh conditions on the furnace roof resulting from high heat, flames, dust and scrap damages. The water cooled equipment enclosure, tied to the water cooled wireway for safe transmission of data is a significant improvement. This allows instrumentation to be located closer to the process environment thus improving process control potential.

While the disclosure has been illustrated and described in detail in the foregoing drawings and description, the same is to be considered as illustrative and not restrictive in character, it being understood that only illustrative embodiments thereof have been shown and described and that all changes and modifications that come within the spirit of the disclosure are desired to be protected.

The invention claimed is:

1. A method of replacing a damaged portion of a furnace roof of a metallurgical or refining furnace, the method comprising:

providing the metallurgical or refining furnace with a top loading roof panel system having a top loading roof structure comprising roof support beams and a plurality of panels coupled to and supported by the roof support beams, wherein the roof support beams includes an inner support ring, an outer support ring, and a plurality of radial beams separate from the inner and outer support rings that extend radially between the inner support ring and the outer support ring to interconnect the inner support ring and the outer support ring;

removing a first panel of the plurality of panels from the roof support beams by lifting the first panel from the top loading roof structure;

replacing the first panel with a second panel, wherein replacing the first panel with the second panel includes inserting the second panel through an opening defined between the inner support ring, the outer support ring, and two circumferentially adjacent radial beams of the plurality of radial beams; and coupling the second panel to the top loading roof structure so that the second panel is supported below tops of the roof support beams and is located to protect underside hot faces of the roof support beams.

2. The method of claim 1, wherein each of the plurality of panels is pie-shaped.

3. The method of claim 2, wherein each of the plurality of panels includes a pie-shaped water cooled panel.

4. The method of claim 1, wherein each of the plurality of panels is supported below the tops of the roof support beams at a height from the base of each roof support beam to the top of each roof support beam.

5. The method of claim 1, further comprising providing at least one quick water disconnect for connecting at least one of the plurality of panels to a water supply.

6. The method of claim 5, further comprising providing another quick water disconnect for connecting the at least one of the plurality of panels to a water return.

7. The method of claim 1, wherein removing the first panel comprises raising the at least one top loading first panel to remove the first panel from the top loading roof structure.

8. The method of claim 1, further comprising sizing the second panel so that the second panel will fit through the opening.

9. The method of claim 1, wherein the first panel is raised away from the bottom of at least one roof support beam up to the top of the at least one roof support beam.

10. A method of replacing a damaged portion of a furnace roof for a metallurgical or refining furnace, the method comprising:

providing a metallurgical or refining furnace comprising a top loading roof panel system, wherein the top loading roof panel system has a top loading roof structure that includes an inner support ring, an outer support ring, and a plurality of radial beams separate from the inner and outer support rings that extend radially between the inner support ring and the outer support ring to interconnect the inner support ring and the outer support ring;

providing a plurality of roof panels coupled to the roof structure so that each of the plurality of roof panels is supported below tops of the inner support ring, the outer support ring, and the radial beams and is located to protect underside hot faces of the inner support ring, the outer support ring, and the radial beams;

removing a first panel of the plurality of panels from the top loading roof structure;

repairing the first panel; and replacing the repaired first panel on the top loading roof structure, wherein replacing the repaired first panel includes engaging the first panel with the inner support ring, the outer support ring, and at least one of the plurality of radial beams using an engagement feature directly affixed to the at least one of the plurality of radial beams to secure the first panel on the top loading roof structure.

11. A roof assembly for a metallurgical or refining furnace, the roof assembly comprising:

a roof structure formed by an inner support beam, an outer support beam, and a plurality of radially-extending support beams separate from the inner and outer support beams that extend radially between the inner support beam and the outer support beam to interconnect the inner support beam and the outer support beam;

a plurality of panels coupled to the roof structure and supported below the support beams, wherein the plurality of panels are disposed in a location to protect an underside of the roof structure;

at least one engagement feature directly affixed to one of the plurality of radially-extending support beams to secure one of the plurality of panels to the roof structure; and a water cooling structure coupled to an underside of at least one of the plurality of panels, wherein the water cooling structure is in fluid communication with at least one quick water disconnect coupled to the at least one of the plurality of panels, and wherein the at least one quick water disconnect and the water cooling structure are further fluidly coupled to a water supply and a water return located to protect the roof structure and positioned away from a liquid metal bath in the furnace.

12. The roof assembly of claim 11, further comprising at least one quick-electrical disconnect fixture coupled to the at least one panel.

13. The roof assembly of claim 11, further comprising a water cooled wireway to protect temperature sensing devices and wiring carrying temperature data to a water cooled junction box.

14. The roof assembly of claim 11, further comprising process monitoring equipment disposed on the roof structure.

15. The roof assembly of claim 11, wherein each one of the plurality of panels comprises a pie-shaped panel.

16. The roof assembly of claim 11, wherein the at least one quick water disconnect is adapted to connect the plurality of panels to the water supply.

17. The roof assembly of claim 11, wherein each of the plurality of panels comprises one or more lugs for lifting each panel from the roof structure.

18. The roof assembly of claim 11, wherein the water cooling structure comprises a sinusoidal pipe through which water passes that has at least one 90° or 180° elbow.

19. The roof assembly of claim 11, wherein each of the plurality of panels comprises a top portion and a side portion, and wherein the side portion aligns with the outer support beam.

20. The roof assembly of claim 11, wherein the inner support beam, the outer support beam, and at least two of the radially-extending support beams define an opening that is sized to receive one of the plurality of panels.

* * * * *